United States Patent Office 2,864,684
Patented Dec. 16, 1958

2,864,684

HERBICIDES

Angelo J. Speziale, Kirkwood, Mo., assignor to Monsanto Chemical Company, St. Louis, Mo., a corporation of Delaware No Drawing. Application September 15, 1955
Serial No. 534,607

16 Claims. (Cl. 71—2.7)

This invention relates to herbicidal compositions and methods of destroying undesired vegetation. The invention also relates to compositions of matter which were not previously known to have herbicidal values.

In copending applications there are described certain types of α-haloacetamide compounds which have unusual herbicidal activity. It was discovered that the α-chloroacetamide required amide substituents in order to produce the biological activity, and it was further demonstrated that an aliphatic substituent of at least one carbon atom and not more than six carbon atoms was necessary to make the compound active.

It has now been discovered that longer substituents on the amide nitrogen atom may result in active herbicide compounds, when the substituent contains certain critical groupings. It has also now been discovered that with respect to this type of compound, the shorter chained compounds have little or no activity. The new class of compounds are those having the following structure:

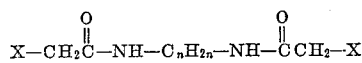

wherein X is a halogen atom, and particularly bromine, chlorine and iodine, and wherein $n$ is an integer from two (2) to six (6).

This class of useful compounds of which some are novel compounds are in general prepared by reacting alkylene diamines with two moles of haloacetyl halide whereby two haloacetyl groups are substituted on the amino radicals. These reactions are effected by conducting the reaction at preferably reduced temperatures in the presence of a stoichiometric proportion of strong alkali, for example sodium hydroxide. During the reaction alkylene bis (α-haloacetamide) is precipitated from the aqueous reaction medium and can be separated by filtration and purified by washing and/or through crystallization. If desired, the reaction may be conducted in the presence of an inert solvent, such as ethylene dichloride, acetone, ether, benzene, or toluene.

Further details of the preparation of the herbicidal compounds are set forth with respect to the following examples.

Example 1

A solution of 12 grams of ethylene diamine in 50 ml. of water is charged to a reaction vessel and cooled to a temperature between —5° C. and 0° C. While maintaining the refrigerated conditions and with constant stirring, 50.5 grams of chloroacetyl chloride and 90 grams of 20% sodium hydroxide solution are gradually added over a period of two hours. As the reaction proceeds a solid precipitate is formed. After the reaction is completed the reaction mixture is filtered and the recovered precipitate is washed with water. A yield of 74 percent of a crystalline N,N'-ethylene bis(α-chloroacetamide) is recovered.

Example 2

The procedure of Example 1 is repeated except that trimethylene diamine is used in place of ethylene diamine. The reaction is conducted in ethylene dichloride solution. The product is recovered in a 95 percent yield as a crystalline solid material by evaporation of the solvent medium. This N,N'-trimethylene bis(α-chloroacetamide) has a melting point of 128–129° C.

Example 3

The procedure of Example 1 is repeated except that tetramethylene diamine is reacted with chloroacetyl chloride under refrigerated conditions. The product which is precipitated is N,N'-tetramethylene bis(α-chloroacetamide).

Example 4

The method of Example 1 is repeated except that hexamethylene diamine is used in place of the ethylene diamine in the presence of chloroacetyl chloride, toluene and a stoichiometric proportion of caustic soda. A solid crystalline product is formed upon evaporation of the solvent medium. This product is identified as N,N'-hexamethylene bis(α-chloroacetamide).

The compounds of this class were measured to determine their herbicidal activity, and it was found that activity increases as the number of methylene groups is increased. The following table of herbicidal screening data represents the average effect on a wide variety of plants with respect to compounds having one, two or three methylene groups between the amide groups using an application of 25 pounds per acre.

| Compound | Herbicidal Activity |
|---|---|
| N,N'-methylene bis(α-chloroacetamide) | none. |
| N,N'-ethylene bis(α-chloroacetamide) | moderate. |
| N,N'-trimethylene bis(α-chloroacetamide) | severe. |

The above table of data demonstrates the lower part of the range showing the progressive improvement of herbicidal activity with the lengthening of the chain between the amide groups. It also shows that an adjacent homolog of the active compounds is entirely inactive. Similar compounds having up to six carbon atoms in a straight chain between the amide groups are also herbicidal.

The solid formulations, frequently referred to as "dusts" may contain in addition to the active ingredient, diluents or extenders, dispersing agents to prevent local high concentrations, and agents to facilitate distribution in soil or soil waters. Suitable solid diluents are those which render the compositions permanently dry and free-flowing. Thus hygroscopic materials are to be avoided unless the compositions also contain a separate substance to serve as an aid to the flowability. Effective solid diluents, preferably pulverulent or granular in form so as to be effective carriers for the active ingredient, are the natural clays, such as china clays, the bentonites and the attapulgites; other minerals in natural state, such as talc, pyrophyllite, quartz, diatomaceous earth, fuller's earth, chalk, rock phosphate and sulfur, and the chemically modified minerals, such as the acid washed bentonite, precipitated calcium phosphate, precipitated calcium carbonate and colloidal silica. These diluents may represent a substantial portion, for example 50 to 98 percent by weight, of the entire formulation as applied to plant or soil. More concentrated herbicides will require dilution by the user in order to properly condition the soil for the most effective usage. The concentrated solid herbicidal formulations can be used with less danger, if it is mixed with the surface soil by means of a disc-plow or harrow at the time of application.

The liquid compositions for herbicidal use may be solutions, or other liquid dispersions. The choice of a liquid medium will depend to some extent upon the physical properties of the active ingredient. The bis(α-chloroacetamides) are not soluble in water and therefore aqueous formulations will necessarily be dispersions of minute particles of the water-insoluble substances in suspension in an aqueous medium. The bis(α-chloroacetamides) may first be dissolved in a suitable organic solvent and the organic solution of the active ingredient then incorporated in water or in any aqueous medium to produce a heterogenous dispersion of the active ingredient in water.

One composition which aids in the effectivity of the herbicidal component is a surface active agent which serves in providing uniform dispersions of all formulation components of both solid and liquid types, and may be anionic, cationic or non-ionic types and includes conventional soaps, such as the water-soluble salts of long chain carboxylic acids, the amino soaps such as the amine salts of long chain carboxylic acids, the sulfonated animal, vegetable and mineral oils, quaternary salts of high molecular weight acids, rosin soaps such as salts of abietic acid, sulfuric acid salts of high molecular weight organic compounds, algin soaps, ethylene oxide condensated with fatty acids, alkyl phenols and mercaptans, and other simple and polymeric compositions having both hydrophilic and hydrophobic functions so as to enable the mixing of otherwise immiscible ingredients. Generally, the surface active agents will be only a minor portion of the formulation as used, for example less than 10 percent and frequently as low as 0.05 percent. In general, concentrations of from 0.5 to 5 percent are found to be optimum.

Many of the formulations are benefited by the incorporation of organic solvents for the active components, such as the water-immiscible organic alcohols, ketones and hydrocarbons, for example isopropanol, benzene, acetone, methylethyl ketone, kerosene, and chlorinated hydrocarbons. The proportions of such organic liquid additives will depend upon the solubility properties of the active ingredient and may require as little as 1 percent or as much as 20 percent in order to provide a uniformly distributed formulation, which is capable of maintaining its distributed state during storage, use and after application to the soil or plant surfaces.

A useful formulation of the herbicidal compositions may involve the solid or liquid concentrate of the active ingredient to which has been added formulation aids or conditioning agents, so that the concentrates may be mixed with a suitable extender or diluent in the field at the time of use. Obviously, for this purpose the dispersing agents will be present in larger concentrations so that upon dilution with water or a solid extender, compositions containing optimum proportions of dispersing agents and active component will be prepared. The solid or liquid formulations are preferably applied by mechanical equipment involving spraying or spreading the formulation on soil or plant surfaces being treated. For this purpose readily flowable compositions are required, either in liquid or solid physical state. Thus a critical aspect of the invention is the fluent carrier without which the optimum herbicidal effects cannot be achieved.

Both the solid and the liquid formulations above described are useful in the application of herbicides because they facilitate the uniform distribution and aid in the destruction of undesirable plants by maintaining the active ingredient in a form which enables the prompt assimilation by the plant and the efficient utilization of its weed destroying properties. The described conditioning agents enable the proper use to achieve the desired herbicidal effects by an unskilled operator without elaborate equipment.

What is claimed is:

1. A method of destroying plants which comprises contacting the plant with a herbicidal amount of a compound having the structure

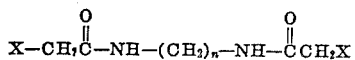

wherein X is a halogen atom of a group consisting of bromine, chlorine and iodine, and wherein $n$ is an integer from two (2) to six (6).

2. A method of destroying plants which comprises contacting the plant with a herbicidal amount of a compound having the structure

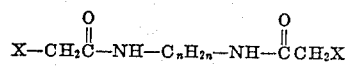

wherein X is a halogen atom of a group consisting of bromine, chlorine and iodine, and wherein $n$ is an integer from two (2) to six (6).

3. A method of destroying plants which comprises contacting the plant at the rate of 5 to 50 pounds per acre of a compound having the structure

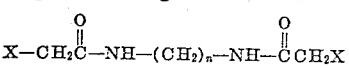

wherein X is a halogen atom of a group consisting of bromine, chlorine and iodine, and wherein $n$ is an integer from two (2) to six (6).

4. A method of destroying plants which comprises contacting the plant at the rate of 5 to 50 pounds per acre of a compound having the structure

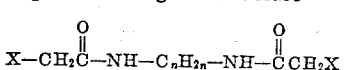

wherein X is a halogen atom of a group consisting of bromine, chlorine and iodine, and wherein $n$ is an integer from two (2) to six (6).

5. A herbicidal composition comprising a compound having the structure

wherein X is a halogen atom of a group consisting of bromine, chlorine and iodine, and wherein $n$ is an integer from (2) to six (6) and a surface active agent.

6. A herbicidal composition comprising a compound having the structure

wherein X is a halogen atom of a group consisting of bromine, chlorine and iodine, and wherein $n$ is an integer from two (2) to six (6) and a surface active agent.

7. The method of claim 2 wherein the compound is N,N'-ethylene bis(α-chloroacetamide).

8. The method of claim 2 wherein the compound is N,N'-trimethylene bis(α-chloroacetamide).

9. The method of claim 2 wherein the compound is N,N',1,2-propylene bis(α-chloroacetamide).

10. The method of claim 2 wherein the compound is N,N'-hexamethylene bis(α-chloroacetamide).

11. The method of claim 2 wherein the compound is N,N'-tetramethylene bis(α-chloroacetamide).

12. The herbicidal composition defined by claim 5 wherein the compound is N,N'-ethylene bis(α-chloroacetamide).

13. The herbicidal composition defined by claim 5 wherein the compound is N,N'-trimethylene bis(α-chloroacetamide).

14. The herbicidal composition defined by claim 5 wherein the compound is N,N',1,2-propylene bis(α-chloroacetamide).

15. The herbicidal composition defined by claim 5 wherein the compound is N,N'-hexamethylene bis(α-chloroacetamide).

16. The herbicidal composition defined by claim 5 wherein the compound is N,N'-tetramethylene bis(α-chloroacetamide).

References Cited in the file of this patent

UNITED STATES PATENTS

| | | |
|---|---|---|
| 2,691,672 | Brust | Oct. 12, 1954 |
| 2,691,673 | Brust | Oct. 12, 1954 |
| 2,711,949 | Barrons | June 28, 1955 |
| 2,720,452 | Denny | Oct. 11, 1955 |
| 2,743,247 | Lotz | Apr. 24, 1956 |

OTHER REFERENCES

Monsanto Chemical Company—532,981 in Belgium patent abstract, October 20, 1954.